United States Patent
Beck et al.

(10) Patent No.: US 7,637,214 B2
(45) Date of Patent: Dec. 29, 2009

(54) METHOD FOR CONTROL OF SUPPORT GAPS FOR A MAGNETIC LEVITATION VEHICLE AND MAGNETIC LEVITATION VEHICLE WITH A CONTROL CIRCUIT OPERATING WITH SAID METHOD

(75) Inventors: Thomas Beck, Dorfen (DE); Siegfried Ellmann, Aschheim (DE); Olaf Huber, Munich (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 0 days.

(21) Appl. No.: 10/592,711

(22) PCT Filed: Mar. 10, 2005

(86) PCT No.: PCT/DE2005/000418

§ 371 (c)(1),
(2), (4) Date: Jun. 25, 2008

(87) PCT Pub. No.: WO2005/092661

PCT Pub. Date: Oct. 6, 2005

(65) Prior Publication Data

US 2008/0257198 A1 Oct. 23, 2008

(30) Foreign Application Priority Data

Mar. 18, 2004 (DE) ................... 10 2004 013 692

(51) Int. Cl.
*B60L 13/06* (2006.01)
*B60L 13/04* (2006.01)
(52) U.S. Cl. ..................... 104/284; 104/281
(58) Field of Classification Search .......... 104/281–286
See application file for complete search history.

(56) References Cited

U.S. PATENT DOCUMENTS 3,865,043 A * 2/1975 Schwarzler ................. 104/284
4,140,063 A * 2/1979 Nakamura ................... 104/284

(Continued)

FOREIGN PATENT DOCUMENTS

DE 34 13 016 10/1984

OTHER PUBLICATIONS

"Magnetschellbahn Transrapid Technik Und System", Thyssen Transrapid GmbH, MSB TR Oct. 1996, pp. 1-16.

*Primary Examiner*—S. Joseph Morano
*Assistant Examiner*—Jason C Smith
(74) *Attorney, Agent, or Firm*—Michael J. Striker

(57) ABSTRACT

A method and a magnetic levitation vehicle operating with this method are described. For the control of support gaps (10a, 10b) that are formed during operation of the magnetic levitation vehicle (1) between a track (2, 3, 4) and a number of carrying magnets (6a, 6b) fastened to said magnetic levitation vehicle (1) and provided with windings (16a, 16b), wherein at least two carrying magnets (6a, 6b) in adjacent positions act upon a suspension frame (8) of said magnetic levitation vehicle (1), the electrical currents flowing through the windings (16a, 16b) are so controlled that the support gaps (10a, 10b) between these two carrying magnets (6a, 6b) and the track (2, 3, 4) adopt pre-determined nominal values (na, nb). In accordance with the invention and in case that the currents through the windings (16a, 16b) of the adjacent carrying magnets (6a) are different under normal conditions, the nominal values (na, nb) for the support gaps (10a, 10b) are altered such that the current through the windings (16a or 16b) of a carrying magnet (6a, 6b) with the lower electric current is increased and/or the electric current through the winding (16b and/or 16a) of a carrying magnet (6b, 6a) with the larger electric current is reduced.

8 Claims, 3 Drawing Sheets

U.S. PATENT DOCUMENTS

| | | | | |
|---|---|---|---|---|
| 4,698,895 | A * | 10/1987 | Miller et al. | 29/464 |
| 4,731,569 | A * | 3/1988 | Bohn | 318/687 |
| 5,053,654 | A * | 10/1991 | Augsburger et al. | 310/12 |
| 5,097,769 | A | 3/1992 | Raschbichler et al. | |
| 5,628,252 | A * | 5/1997 | Kuznetsov | 104/284 |
| 5,666,883 | A * | 9/1997 | Kuznetsov | 104/281 |
| 5,868,077 | A * | 2/1999 | Kuznetsov | 104/281 |
| 6,827,022 | B2 * | 12/2004 | van den Bergh et al. | 104/284 |
| 7,380,508 | B2 * | 6/2008 | Li | 104/284 |
| 2005/0252407 | A1 * | 11/2005 | Li | 104/139 |
| 2006/0096495 | A1 * | 5/2006 | Fischperer | 104/281 |
| 2006/0097116 | A1 * | 5/2006 | Fischperer | 246/468 |
| 2006/0130699 | A1 * | 6/2006 | Thornton et al. | 104/284 |
| 2006/0219128 | A1 * | 10/2006 | Li | 104/284 |
| 2006/0243157 | A1 * | 11/2006 | Li | 104/281 |
| 2006/0243158 | A1 * | 11/2006 | Li | 104/281 |
| 2007/0095245 | A1 * | 5/2007 | Li | 104/284 |
| 2007/0131134 | A1 * | 6/2007 | Post | 104/284 |
| 2008/0257198 | A1 * | 10/2008 | Beck et al. | 104/284 |

FOREIGN PATENT DOCUMENTS

| | | |
|---|---|---|
| DE | 35 16 036 | 11/1986 |
| DE | 39 17 058 | 11/1990 |
| DE | 39 28 278 | 2/1991 |
| DE | 40 23 067 | 1/1992 |
| WO | 97/30504 | 8/1997 |

* cited by examiner

METHOD FOR CONTROL OF SUPPORT GAPS FOR A MAGNETIC LEVITATION VEHICLE AND MAGNETIC LEVITATION VEHICLE WITH A CONTROL CIRCUIT OPERATING WITH SAID METHOD

CROSS-REFERENCE TO RELATED APPLICATION

The invention described and claimed hereinbelow is also described in German Patent Application DE 10 2004 013 692.0 filed on Mar. 18, 2004. This German Patent Application, whose subject matter is incorporated here by reference, provides the basis for a claim of priority of invention under 35 U.S.C. 119(a)-(d).

BACKGROUND OF THE INVENTION

The present invention relates to a method for control of support gaps for a magnetic levitation vehicle, and also to a magnetic levitation vehicle with a control circuit operating with said method.

The invention relates to a method pursuant to the preamble of claim 1 and to a magnetic levitation vehicle pursuant to the preamble of claim 4.

Magnetic levitation vehicles, particularly those equipped with long stator linear motors, have a number of carrying (supporting) magnets mounted in the direction of travel and facing a guideway for the magnetic levitation vehicle, particularly a long stator mounted to it. For operation of the magnetic levitation vehicle, the carrying magnets are activated at first in order to form support gaps of a given height between the guideway and the magnetic levitation vehicle (e.g. 10 mm). Next the magnetic levitation vehicle is set in motion, for which purpose the carrying magnets in case of long stator linear motors simultaneously supply the excitation field for the linear motor (e.g. DE 39 17 058 C1). Compliance with the nominal values defined for the support gaps is assured by gap sensors (e.g. DE 35 16 036 C2) and control circuits connected to them which control the electrical currents in the windings of the carrying magnets in such a manner that the support gaps during operation substantially retain the same size (e.g. "Magnetschnellbahn Transrapid-Technik und System", Thyssen Transrapid GmbH, MSB Tr10/96).

The carrying magnets of such magnetic levitation vehicles are generally mounted to support brackets which in turn are fastened to suspension frames or the like for a car body. The mechanical setup is preferably so chosen that two support brackets each are provided at the longitudinal ends of the suspension frames and fastened to different carrying magnets in a way that at least two neighbouring carrying magnets act there upon the suspension frame.

On account of unavoidable tolerances, e.g. in the sensor signals indicating the actual values of the support gaps, in the control circuits connected with the sensors as well as in the mechanical structure, it may happen that the windings of neighbouring carrying magnets are flown through by differently high electrical currents, although they establish the same support gap. This is undesirable, because different electrical currents lead to different loads of the windings, e.g. due to heat development.

SUMMARY OF THE INVENTION

The technical problem underlying the present invention therefore is to modify the method and the magnetic levitation vehicle of the above mentioned species in such a manner that differences, if any, between the electrical currents flowing through the windings of neighbouring carrying magnets are reduced or even brought to zero despite the above mentioned tolerances.

In keeping with these objects, one feature of the present invention resides, briefly stated, in a method applied in a magnetic levitation vehicle to control support gaps that are formed during operation of the magnetic levitation vehicle between a track and a number of carrying magnets fastened to said magnetic levitation vehicle and provided with windings wherein at least two carrying magnets in adjacent positions act upon a suspension frame of said magnetic levitation vehicle and wherein the electrical currents flowing through the windings are so controlled that the support gaps between these two carrying magnets in said adjacent positions and the track adopt pre-determined nominal values of equal size, characterized in that in case that for obtaining said predetermined values the currents through the windings of the adjacent carrying magnets must be different under normal conditions, the nominal values for the support gaps are altered such that the current through the windings of a carrying magnet with the lower electric current is increased and/or the electric current through the winding of a carrying magnet with the larger electric current is reduced.

Another feature of the present invention resides, in a magnetic levitation vehicle having control circuits for controlling support gaps formed during its operation between a track and a number of carrying magnets fastened to said vehicle and provided with windings wherein the control circuits have means for controlling electrical currents flowing through said windings in such a way that the support gaps adopt pre-determined nominal values, characterized in that means for correcting respective nominal values is dependence on the electrical currents flowing through said windings are assigned to the control circuits of at least two adjacent carrying magnets.

The invention bears the advantage that when undesirable differences occur between the winding currents of neighbouring carrying magnets a levelling of the magnetic currents is performed, and that slight differences in the support gaps generated by the respective carrying magnets are tolerated instead thereof. Such deviations from the nominal values for the support gaps are taken-up and absorbed by the mechanical structures of the suspension frames, without impairing the travelling comfort or entailing other disadvantages, and therefore these deviations can be tolerated without any problem.

The invention is explained in greater detail hereinbelow by means of an embodiment and based on the drawings enclosed hereto wherein:

DESCRIPTION OF THE PREFERRED EMBODIMENTS

Figure 1:
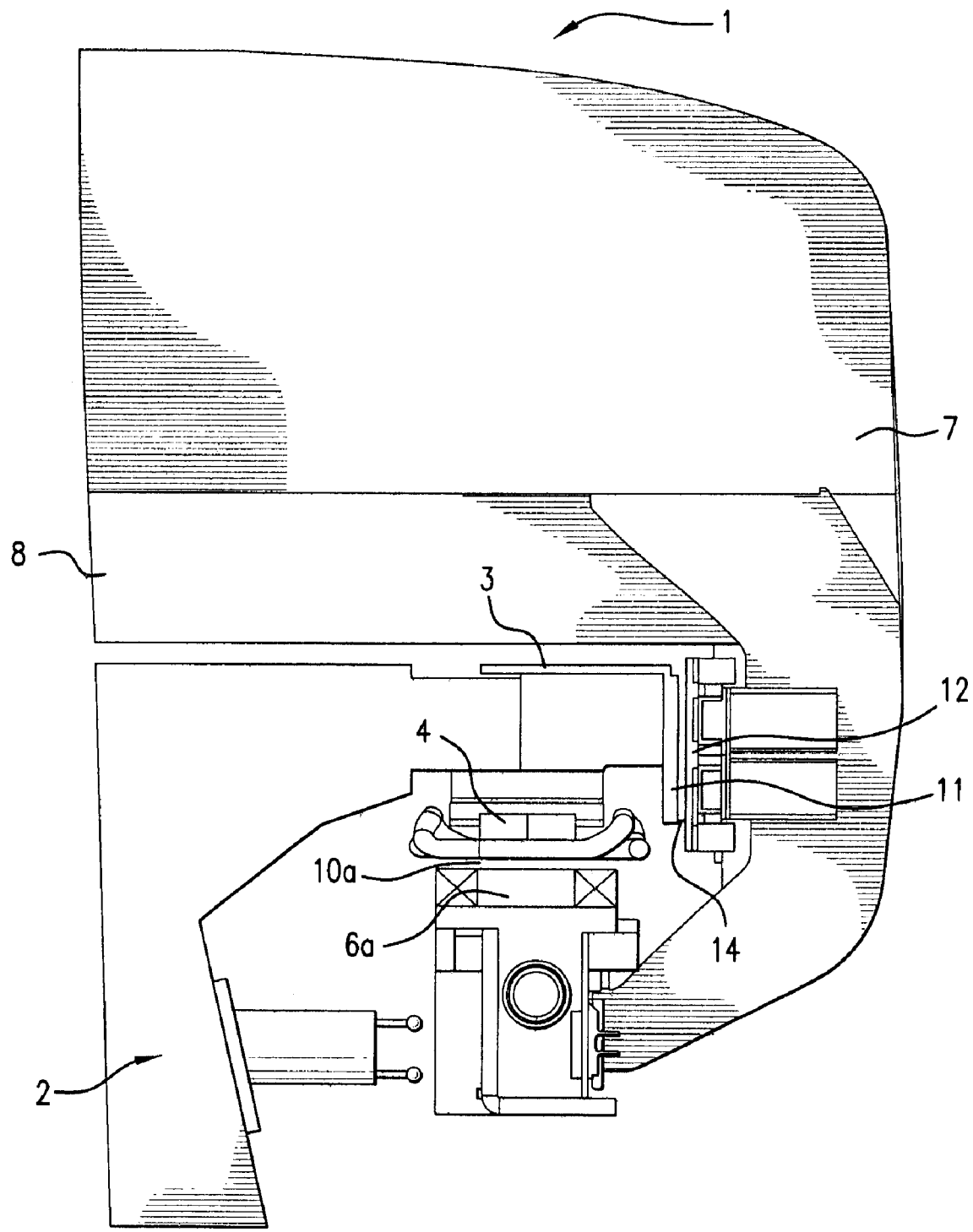
FIG. 1 schematically shows a partial section through a usual magnetic levitation vehicle in the area of a track provided with a long stator.
Figure 2:
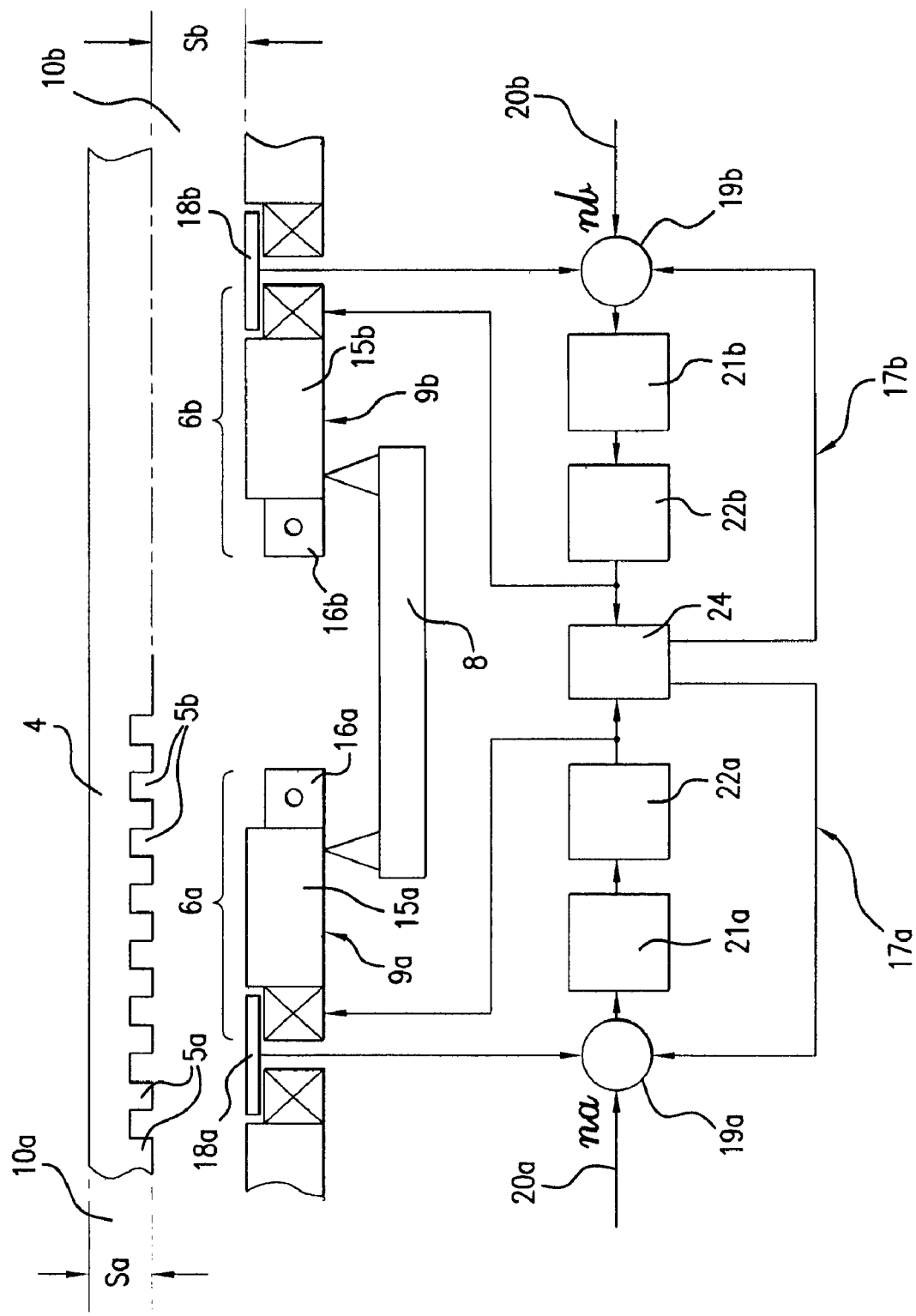
FIG. 2 schematically shows two control circuits for neighbouring carrying magnets of a magnetic levitation vehicle.

FIG. 1 and FIG. 2 schematically show a magnetic levitation vehicle 1 which is conventionally movably mounted on a guideway extending in longitudinal direction of a route, said guideway being comprised of supports 2 made of steel and/or concrete as well as guideway plates 3 mounted on it. The propulsion of the magnetic levitation vehicle 1 is effected, for example, by a long stator motor which comprises stator packets 4 affixed underneath said guideway plate 3 and arranged consecutively in the longitudinal direction thereof. As shown on FIG. 2, the stator packets 4 have alternatingly succeeding teeth 5a and grooves 5b into which three-phase alternating current windings are inserted (not shown) that are fed with three-phase current of a variable amplitude and frequency. The actual excitation field of the long stator motor is generated by magnet arrangements acting as carrying magnets 6a, 6b which are affixed by at least one lateral support bracket 7 to a suspension frame 8 of said magnetic levitation vehicle 1 and which have magnet poles 9a, 9b facing the grooves 5b of stator packets 4. The carrying magnets 6a, 6b not only provide the excitation field, but also fulfil the function of carrying and levitating by maintaining given gaps 10a and/or 10b with heights of sa and/or sb between said carrying magnets 6a, 6b and said guideway or the stator packets 4 thereof during operation of the magnetic levitation vehicle 1.

For a proper guidance of the magnetic levitation vehicle 1 on the track, the guideway plate 3 is provided with laterally affixed lateral guide rails 11, which are faced by guiding magnets 12 also mounted to the support brackets 7 and serving for maintaining a gap 14 corresponding to gap 10a, 10b between itself and the guiding rail 10 during operation of the vehicle.

Magnetic levitation vehicles 1 and their magnet arrangements are generally known to an expert, e.g. through printed publications U.S. Pat. No. 4,698,895, DE 39 28 278 A1, and PCT WO 97/30504 A1, which for the sake of simplicity are made a part of the present disclosure by reference thereto.

The embodiment according to FIG. 2 shows two neighbored carrying magnets 6a and 6b which are mounted one behind the other in the direction of travel, from which magnets 6a, 6b only two end sections facing each other and having a magnet pole 9a and 9b each are shown. In fact, each carrying magnet 6a, 6b is preferably comprised of a magnet arrangement having a number of e.g. twelve magnet poles 9a and/or 9b mounted at a certain distance to each other in the direction of travel. Each magnet pole 9a, 9b comprises a core 15a, 15b and a winding 16a, 16b surrounding it.

For example, the carrying magnets 6a, 6b face the stator packets 4 in such a way that the quantities sa and sb of the support gaps 10a, 10b for instance amount to 17 mm, when the magnetic levitation vehicle 1 is out of operation, i.e. when it is in a status set down on a gliding rail, while a value of 10 mm is maintained, for example, to establish the suspended status which is typical of the magnetic levitation vehicle 1.

The control circuits 17a and 17b schematically indicated on FIG. 2 serve for maintaining the given nominal values of e.g. 10 mm for the support gaps 10a, 10b. The control circuit 17a has a gap sensor 19a, which measures the actual size or the actual value, respectively, of gap 10a between the carrying magnet 6a or its magnet pole 9a and the stator packets 4 and which supplies an electrical signal that corresponds to the actual value of the quantity sa. The gap sensor 18a is connected via a comparative circuit 19a to which a nominal value for gap 10a is fed to via a line 20a to a controller 21a. The comparative circuit 19a compares the actual values sa of the gap sensor 18a with the nominal value na and supplies at its output a differential signal by means of which a control signal is generated in the controller 21 and fed to an actuator element 22a. The actuator element 22a generates an electrical current for the winding 16a of the carrying magnet 6a and particularly supplies such an electric current to this winding 16a that the size sa of gap 10a permanently substantially corresponds to the nominal value na that is pre-determined via the line 20a.

The control circuit 17b is set-up accordingly, which is the reason why its component parts are designated with the corresponding reference symbols 18b to 22b and nb. The control circuit 17b serves for controlling a gap 10b of the size sb between the carrying magnets 6b and the stator packets 4.

Figure 3A:
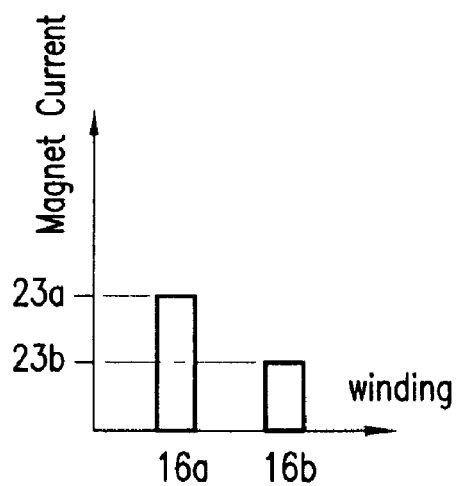
FIG. 3 in various graphical representations shows the control strategy pursued by the invention.
Figure 3B:
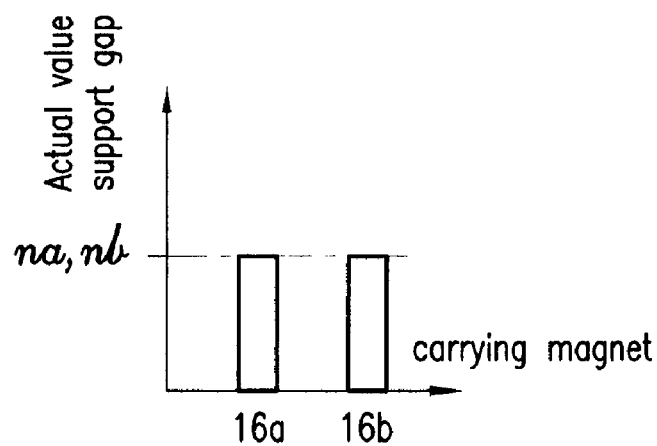

Finally, in FIG. 2, one of the suspension frames 8 of the magnetic levitation vehicle 1 is indicated which is supported at one end by the carrying magnet 6a and at the other end by the neighbouring carrying magnet 6b. In a normal case, therefore, both carrying magnets 6a and 6b should adjust and set the respective support gap 10a, 10b substantially to identical values na and nb as schematically shown on FIG. 3b. Because of the tolerances outlined hereinabove (e.g. faults in measuring signals of gap sensors 18a, 18b), it may happen that the electric currents through the windings 16a, 16b of the two carrying magnets 6a and 6b acting upon the suspension frame 8 differ from each other. This is indicated for example on FIG. 3a, where the reference number 23a indicates the electric current through the winding 16a, and where the reference numbers 23b indicates the electric current through the winding 16b. For avoidance of such different electric currents, the procedure according to this invention is as follows.

To begin with, a corrective circuit 24 (FIG. 1) is provided, which has two inputs connected with the outputs of the actuator elements 22a, 22b and two outputs that each lead to one of the two comparative circuits 19a, 19b with which also the lines 20a, 20b are connected which define the nominal values na, nb for the support gaps 10a, 10b. Based upon the different output values of the actuator elements 22a and 22b being proportional to the electric currents 23a, 23b (FIG. 2a) flowing through the windings 16a, 16b, corrective values for the nominal values na, nb of the support gaps 10a, 10b are calculated in the corrective circuit 24. In a special case (electric current 23a>electric current 23b), a signal for the comparative circuit 19b is calculated from this difference in electric current by means of which signal the nominal value nb for the support gap 10b is reduced. Thereby, the winding 16b receives more electric current, thus making the support gap 10b smaller as compared with support gap 10a, as shown on FIG. 3d. This influence on the nominal value nb is exerted until the electric currents through the two windings 16a, 16b are substantially equal.

Figure 3C:
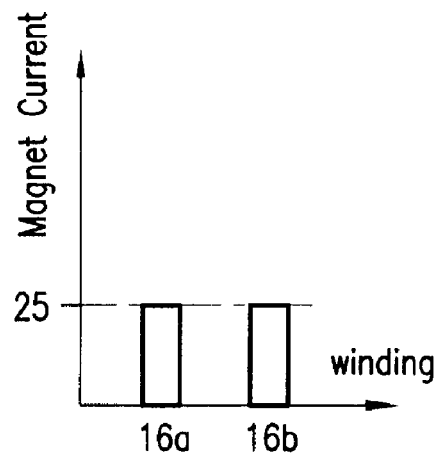
Figure 3D:
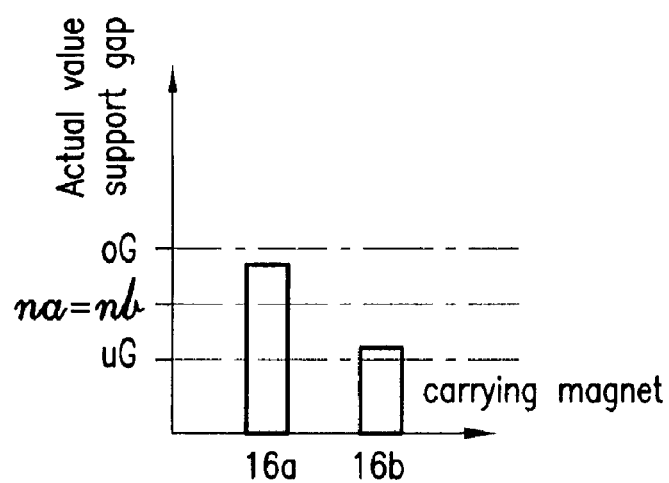

However, a lower limit value, i.e. a pre-selected minimal value, is pre-determined for the support gap 10b which lies for example at 9 mm instead of the usual 10 mm and which is designated with uG on FIG. 3d. If no balance in electric currents through the windings 16a, 16b is achieved when reaching this limit value uG, then a corrective value is also fed now to the comparative circuit 19a by way of which the nominal value na for the electric current through the winding 16a is reduced. As a consequence hereof, the size sa of the support gap 10a becomes greater than the value that corresponds to the nominal value na (FIG. 2d). Also this correction is only made until an upper limit value oG, i.e. for example a pre-determined maximal value of 11 mm instead of the usual 10 mm is reached.

Usually, a balance in the winding currents corresponding to a value 25 in FIG. 3c can constantly be obtained in this way, and the magnetic levitation vehicle 1 is then operated with slightly different support gaps 10a, 10b. Even if the electric currents through the two windings 16a, 16b are not yet identical to each other after these corrections have been made, they are nevertheless so close to each other that on the one hand the resultant different thermal losses in the windings 16a, 16b can be tolerated and that on the other hand the values sa, sb obtained for the support gaps 10a, 10b are adequately close to the desired nominal values na, nb, so that the different load distribution associated therewith can also be tolerated.

Differences between the winding currents that have once been determined by way of the corrective circuit 24 are basically maintained permanently. If they vary however, in the course of operation of the magnetic levitation vehicle, at first the enhancement of the support gap 10a, and then, if required, also the reduction of the support gap 10b is cancelled. Moreover, the corrections of the nominal values na, nb as described hereinabove are immediately cancelled in case of a failure of the carrying magnets 6a, 6b involved.

Thus, if unavoidable fabrication tolerances and the like occur, the control strategy as described before does not intend to keep the support gaps 10a, 10b constant at equal pre-determined values sa and/or sb, but to provide for equal winding currents 25 (FIG. 3c), if possible, while tolerating minor gap discrepancies.

The invention is not limited to the described embodiment that can be diversified in a plurality of ways. In particular, this applies to the values for the quantities na, nb of the support gaps 10a and 10b, which are only given by way example, and for their upper and/or lower limit values. Furthermore, the corrective circuit 24 only represents a possible means for correction of the nominal values na, nb, because an expert in control engineering can also perform these corrections in any other expedient way. Moreover, it would be conceivable to apply the described control approach in a suitable variation also for the adaption of the winding currents to each other of more than two neighbouring carrying magnets. Besides, it is obvious that the number of windings 16a, 16b per carrying magnet 6a, 6b can be chosen to be different and that each carrying magnet 6a, 6b, in particular, may be a half-magnet, for example, whose windings are connected to a control circuit allocated to it but is independent of the respective other half-magnet. It would also be possible to divide the corrective circuit 24 into two sections which are individually allocated to the control circuits 17a and 17b, respectively. Finally it is self-explanatory that the different features can also be applied in combinations other than those described and shown hereinabove.

The invention claimed is:

1. A method applied in a magnetic levitation vehicle (1) to control support gaps (10a, 10b) that are formed during operation of the magnetic levitation vehicle (1) between a track (2, 3, 4) and a number of carrying magnets (6a, 6b) fastened to said magnetic levitation vehicle (1) and provided with windings (16a, 16b), wherein at least two carrying magnets (6a, 6b) in adjacent positions act upon a suspension frame (8) of said magnetic levitation vehicle (1) and wherein the electrical currents flowing through the windings (16a, 16b) are so controlled that the support gaps (10a, 10b) between these two carrying magnets (6a, 6b) in said adjacent positions and the track (2, 3, 4) adopt pre-determined nominal values (na, nb) of equal size, characterized in that in case that for obtaining said predetermined values (na, nb) the currents through the windings (16a and/or 16b) of the adjacent carrying magnets (6a and/or 6b) must be different under normal conditions, the nominal values (na, nb) for the support gaps (10a, 10b) are altered such that the current through the windings (16a or 16b) of a carrying magnet (6a, 6b) with the lower electric current is increased and/or the electric current through the winding (16b and/or 16a) of a carrying magnet (6b and/or 6a) with the larger electric current is reduced.

2. A method according to claim 1, characterized in that if differences in electric current in the two windings (16a, 16b) occur, it is at first tried to make the electric currents in both windings (16a, 16b) equal to each other by increasing the electric current flowing through the winding with the lower electric current (16a and/or 16b) at most until a minimal gap (uG) is reached.

3. A method according to claim 2, characterized in that if the two electric currents cannot be made equal by increasing the electric current in the winding carrying the lower electric current (16a and/or 16b), the electric current flowing through the winding carrying the larger electric current (16b and/or 16a) is reduced at most until a maximal gap (oG) is reached.

4. A magnetic levitation vehicle having control circuits (17a, 17b) for controlling support gaps (10a, 10b) formed during its operation between a track (2, 3, 4) and a number of carrying magnets (6a, 6b) fastened to said vehicle (1) and provided with windings (16a, 16b), wherein the control circuits (17a, 17b) have means (19a to 22a and/or 19b to 22b) for controlling electrical currents flowing through said windings (16a, 16b) in such a way that the support gaps (10a, 10b) adopt pre-determined nominal values (na, nb), characterized in that means (24) for correcting respective nominal values (na, nb) is dependence on the electrical currents flowing through said windings (16a, 16b) are assigned to the control circuits (17a, 17b) of at least two adjacent carrying magnets (6a, 6b).

5. A magnetic levitation vehicle according to claim 4, characterized in that the control circuits (17a, 17b) have actuator elements (22a, 22b) with outputs connected to the windings (16a, 16b) and comparative circuits (19a, 19b) for comparing the nominal values and actual values (na, nb and sa, sb) of said support gaps (10a, 10b), wherein said means (24) contain a corrective circuit which on the input side is connected to the outputs of the actuator elements (22a, 22b) and on the output side to the comparative circuits (19a, 19b).

6. A magnetic levitation vehicle according to claim 4 or 5, characterized in that the corrective circuit acts in the sense of an increase (decrease) in electric current if the electric current flowing through the winding (16a, 16b) of an associated carrying magnet (6a, 6b) becomes lower (larger) than the electric current flowing through the winding (16b and/or 16a) of the other carrying magnet (6b and/or 6a).

7. A magnetic levitation vehicle according to claim 4 or 5, characterized in that upper and lower limit values (oG, uG) are assigned to said support gaps (10a, 10b).

8. A method applied in a magnetic levitation vehicle (1) to control support gaps (10a, 10b) that are formed during operation of the magnetic levitation vehicle (1) between a track (2, 3, 4) and a number of carrying magnets (6a, 6b) fastened to said magnetic levitation vehicle (1) and provided with windings (16a, 16b), wherein at least two carrying magnets (6a, 6b) in adjacent positions act upon a suspension frame (8) of said magnetic levitation vehicle (1) and wherein the electrical currents flowing through the windings (16a, 16b) are so controlled that the support gaps (10a, 10b) between these two carrying magnets (6a, 6b) and the track (2, 3, 4) adopt pre-determined nominal values (na, nb), characterized in that in case that the pre-determined nominal values (na, nb) are obtained under normal conditions by different currents through the windings (16a and/or 16b) of the adjacent carrying magnets (6a and/or 6b), the nominal values (na, nb) for the support gaps (10a, 10b) are altered such that the current through the windings (16a or 16b) of a carrying magnet (6a, 6b) with the lower electric current is increased and/or the electric current through the winding (16b and/or 16a) of a carrying magnet (6b and/or 6a) with the larger electric current is reduced.

* * * * *